(12) United States Patent
Stathakis et al.

(10) Patent No.: US 10,833,445 B1
(45) Date of Patent: Nov. 10, 2020

(54) CABLE CONNECTOR HOUSING ATTACHMENT FOR PROTECTING AND DIRECTING A CABLE

(71) Applicant: International Business Machines Corporation, Armonk, NY (US)

(72) Inventors: Karl Stathakis, Rochester, MN (US); Robert J. Monahan, Rochester, MN (US); Connor L. Smith, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/540,754

(22) Filed: Aug. 14, 2019

(51) Int. Cl.
| H01R 13/50 | (2006.01) |
| H01R 13/627 | (2006.01) |
| H01R 43/18 | (2006.01) |
| B29C 45/26 | (2006.01) |
| H01R 12/78 | (2011.01) |
| B29L 31/36 | (2006.01) |

(52) U.S. Cl.
CPC ............ *H01R 13/50* (2013.01); *B29C 45/26* (2013.01); *H01R 12/78* (2013.01); *H01R 13/6271* (2013.01); *H01R 43/18* (2013.01); *B29L 2031/36* (2013.01)

(58) Field of Classification Search
CPC .... H01R 13/50; H01R 13/6271; H01R 12/78; H01R 12/59; H01R 12/77; H01R 43/18; H01R 4/16; B29C 45/26; B29L 2031/36
USPC ........................................................ 439/492
See application file for complete search history.

(56) References Cited

U.S. PATENT DOCUMENTS

| 3,333,667 | A | 8/1967 | Nordin et al. |
| 4,840,023 | A | 6/1989 | Borsani |
| 5,394,297 | A | 2/1995 | Toedter |
| 6,193,544 | B1 * | 2/2001 | McGinnis ............ H01R 12/78 439/492 |
| 6,305,970 | B1 * | 10/2001 | Nagai ................. H01R 12/592 439/422 |
| 6,464,534 | B1 * | 10/2002 | Schramme ........... H01R 12/771 439/353 |
| 7,241,165 | B2 * | 7/2007 | Scheer ................ H01R 12/675 439/272 |
| 7,551,748 | B2 | 6/2009 | Kamo et al. |
| 2004/0186350 | A1 | 9/2004 | Brenneman et al. |

FOREIGN PATENT DOCUMENTS

CN    1220016 A    6/1999

* cited by examiner

*Primary Examiner* — Hien D Vu
(74) *Attorney, Agent, or Firm* — Nathan Rau

(57) ABSTRACT

A cable connector housing attachment for protecting and directing a cable including an anchor portion configured for attachment to a cable connector housing; and a cable guide portion comprising a base wall, a first side wall, and a second side wall each extending from the anchor portion in the direction of the cable from the cable connector housing, wherein the first side wall comprises a guiding edge opposite the anchor portion, wherein the guiding edge creates a non-parallel and non-perpendicular angle relative to the direction of the cable from the cable connector housing, and wherein the guiding edge directs a bend of the cable in a direction offset from the direction of the cable from the cable connector housing.

17 Claims, 8 Drawing Sheets

CABLE CONNECTOR HOUSING ATTACHMENT FOR PROTECTING AND DIRECTING A CABLE

BACKGROUND

Field of the Invention

The field of the invention is cable connector housing attachments, or, more specifically, products and methods of manufacture for a cable connector housing attachment for protecting and directing a cable.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago. These advances in computer systems has led to ever more complicated cabling schemes between components within the computer system. Cables for frequently moved or replaced components may become damaged over time due to stress.

SUMMARY

Products and methods of manufacture for a cable connector housing attachment for protecting and directing a cable. The cable connector housing attachment for protecting and directing a cable includes an anchor portion configured for attachment to a cable connector housing; and a cable guide portion comprising a base wall, a first side wall, and a second side wall each extending from the anchor portion in the direction of the cable from the cable connector housing, wherein the first side wall comprises a guiding edge opposite the anchor portion, wherein the guiding edge creates a non-parallel and non-perpendicular angle relative to the direction of the cable from the cable connector housing, and wherein the guiding edge directs a bend of the cable in a direction offset from the direction of the cable from the cable connector housing.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Computer cables, particularly cables within computer housing, often need to be guided along convoluted paths between components. These paths may cause the cable to collide or otherwise interface with components within the system, which creates a number of problems, including bending a cable at a bend radius that is less than the minimum specified, applying a force that creates torsion at the interface between cable and cable connector housing, and applying a force that causes stress along the cable itself. Further, relatively stiff cables may require a sturdy implement to generate enough force to flex the cable as desired. Finally, some computer housing setups may require a tight but controlled cable bend but lack available mount points within the housing structure.

Figure 1:
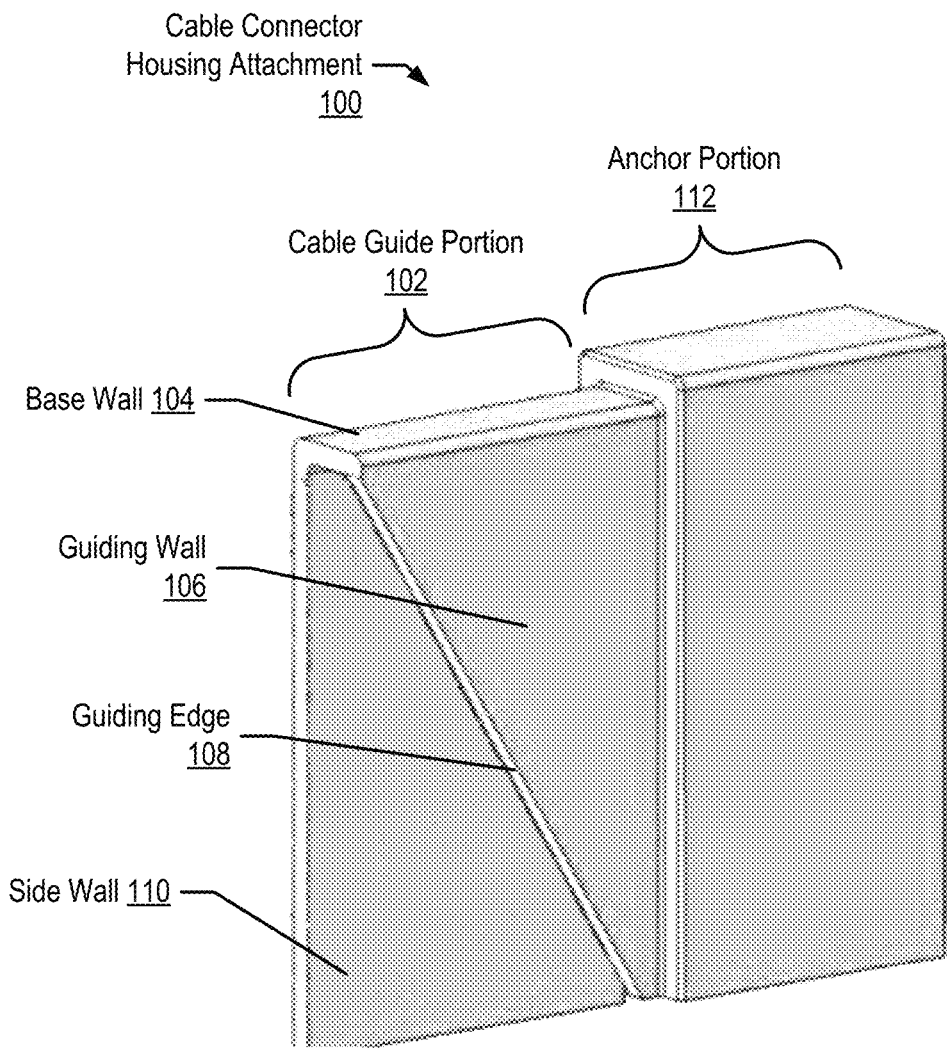
FIG. 1 sets forth a perspective view of an example cable connector housing attachment for protecting and directing a cable according to embodiments of the present invention.
Figure 2:
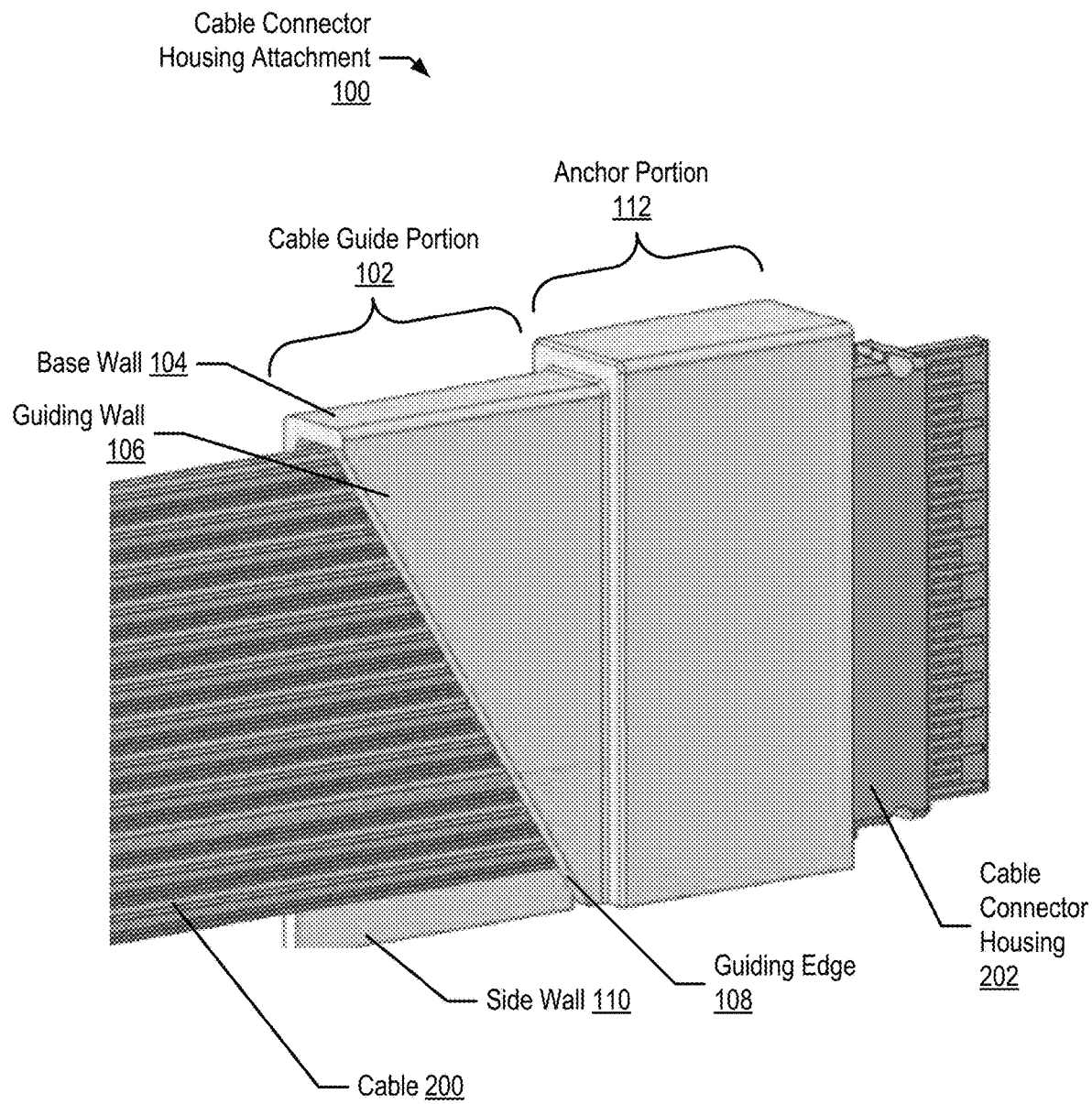
FIG. 2 depicts another perspective view of an example cable connector housing attachment for protecting and directing a cable in accordance with embodiments of the present invention.

Exemplary products and methods of manufacture for a cable connector housing attachment for protecting and directing a cable in accordance with the present invention are described with reference to the accompanying drawings, beginning with FIG. 1 and FIG. 2. FIG. 1 sets forth a perspective view of an example cable connector housing attachment for protecting and directing a cable according to embodiments of the present invention. FIG. 2 shows the cable connector housing attachment (100) attached to a cable connector housing (202) and a cable (200) extending from the cable connector housing (202). The cable connector housing attachment (100) includes an anchor portion (112) and a cable guide portion (102). The cable guide portion (102) includes a base wall (104), a side wall (110), and a guiding wall (106). The guiding wall (106) includes a guiding edge (108) on the edge opposite the anchor portion (100). The cable connector housing attachment (100) may be a single piece or include multiple pieces. Further, the cable connector housing attachment (100) may comprise one or more materials, such as plastic or metal.

The anchor portion (112) attaches to the cable connector housing to minimize movement of the cable connector housing attachment (100) relative to the cable connector housing (202). The inner side of one or more walls of the anchor portion (112) may rest flush or nearly flush against at least one side of the cable connector housing (202). The cable connector housing attachment (100) may attach to the cable connector housing (200) and/or the cable (102) at one or more points to control the direction at which the cable twists, turns, or bends. The cable connector housing attachment (100) may attach to the cable connector housing (202) in a variety of ways, including only friction, with the aid of an anchor base extension (as shown in FIG. 4), or with the aid of an attachment mechanism, such as a hook or clip (as shown in FIGS. 3, 4, 6, and 7).

Figure 5:
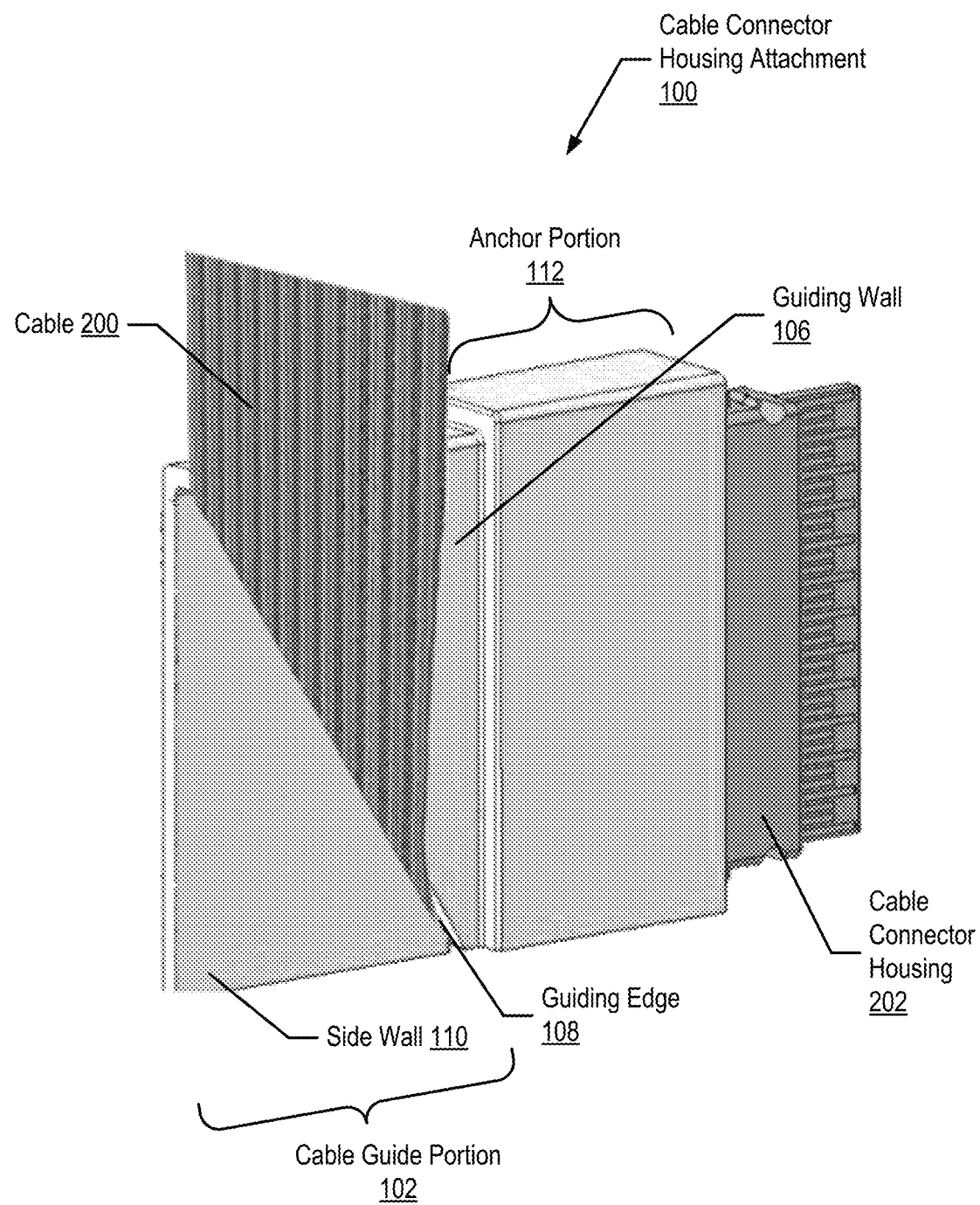
FIG. 5 depicts another perspective view of an example cable connector housing attachment for protecting and directing a cable in accordance with embodiments of the present invention.
Figure 6:
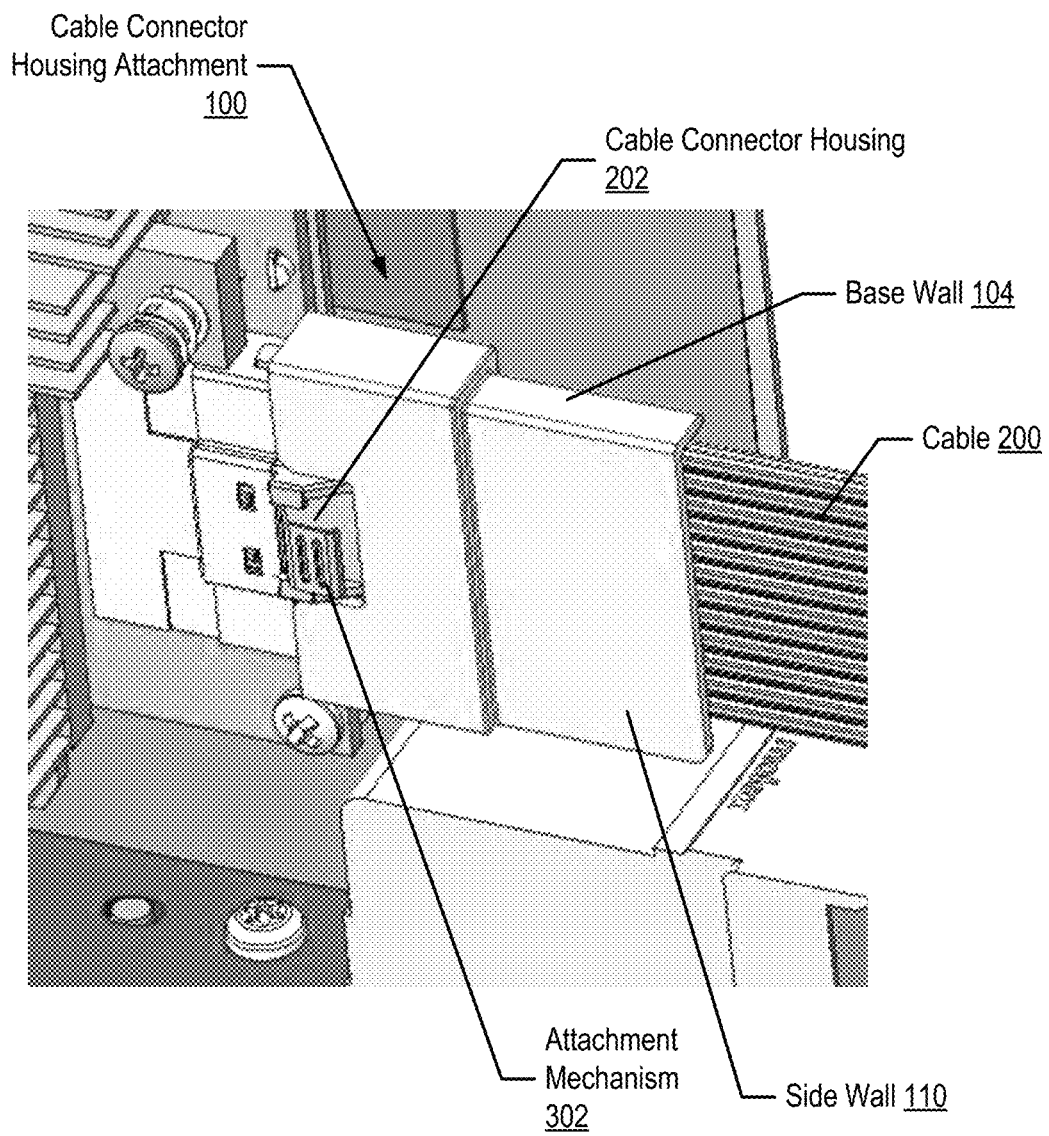
FIG. 6 depicts another perspective view of an example cable connector housing attachment for protecting and directing a cable in accordance with embodiments of the present invention.
Figure 7:
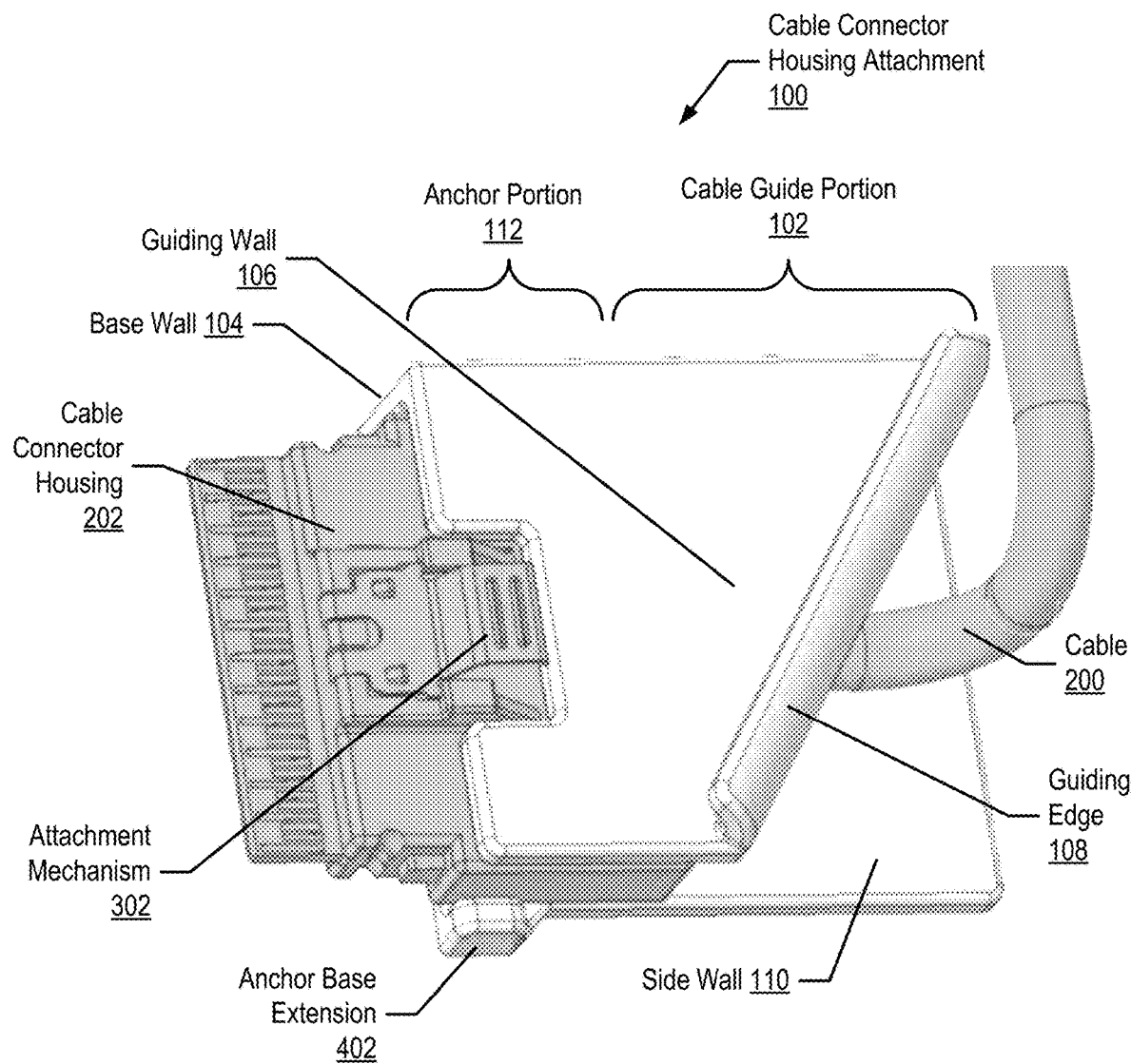
FIG. 7 depicts another perspective view of an example cable connector housing attachment for protecting and directing a cable in accordance with embodiments of the present invention.

The anchor portion (112) and the cable guide portion (102) may be different sizes (as shown in FIGS. 1-6) or the same or similar sizes (as shown in FIG. 7). In the example shown in FIG. 1 and FIG. 2, the walls of the anchor portion (112) along the axis perpendicular to the direction of the cable (200) from the cable connector housing (202) are larger in dimension than the adjacent walls of the cable guide portion (102). In other words, the dimension of each wall of the anchor portion (112) along and adjacent to the cable guide portion (102) is greater than the dimension of each wall of the cable guide portion (102) along and adjacent to the anchor portion (112).

The cable guide portion (102) houses the cable (200) near the point at which the cable (200) attaches to the cable connector housing (202). The cable (200) may be a ribbon cable as shown in FIGS. 2-6, or another type of cable as shown in FIG. 7. The cable guide portion (102) guides or bends the cable (200) in a direction dictated by the angle of the guiding edge (108).

The base wall (104) extends from the anchor portion (112) to create a stable channel between the side wall (110) and the guiding wall (106). The base wall (104) also prevents the cable from bending directly at the cable connector housing. The side wall (110) extends from the anchor portion (112) and also prevents the cable from bending directly at the cable connector housing.

The guiding wall (106) is a side wall that includes the guiding edge (108). The guiding wall (106) extends from the anchor portion (112) to the guiding edge (108). The guiding edge (108) is the edge opposite the anchor portion (112) over which the cable (200) guided or bent. The guiding edge (108) creates a non-parallel and non-perpendicular angle relative to the direction of the cable (200) from the cable connector housing (202). In other words, the guiding edge (108) is not parallel to the direction of the cable (200) from the cable connector housing (202) and is also not perpendicular to the direction of the cable (200) from the cable connector housing (202). The angle of the guiding edge (108) may be less than 90 degrees offset from the angle of the direction of the cable (200) from the cable connector housing (202).

The guiding edge (108) may also provide a sturdy pivot location over which a stiffer cable (200) may be bent. Specifically, the guiding edge (108) may provide a counter force to the force necessary to flex a stiffer cable (200) at a particular angle, preventing the cable (200) from bending at the cable connector housing (202).

Figure 3:
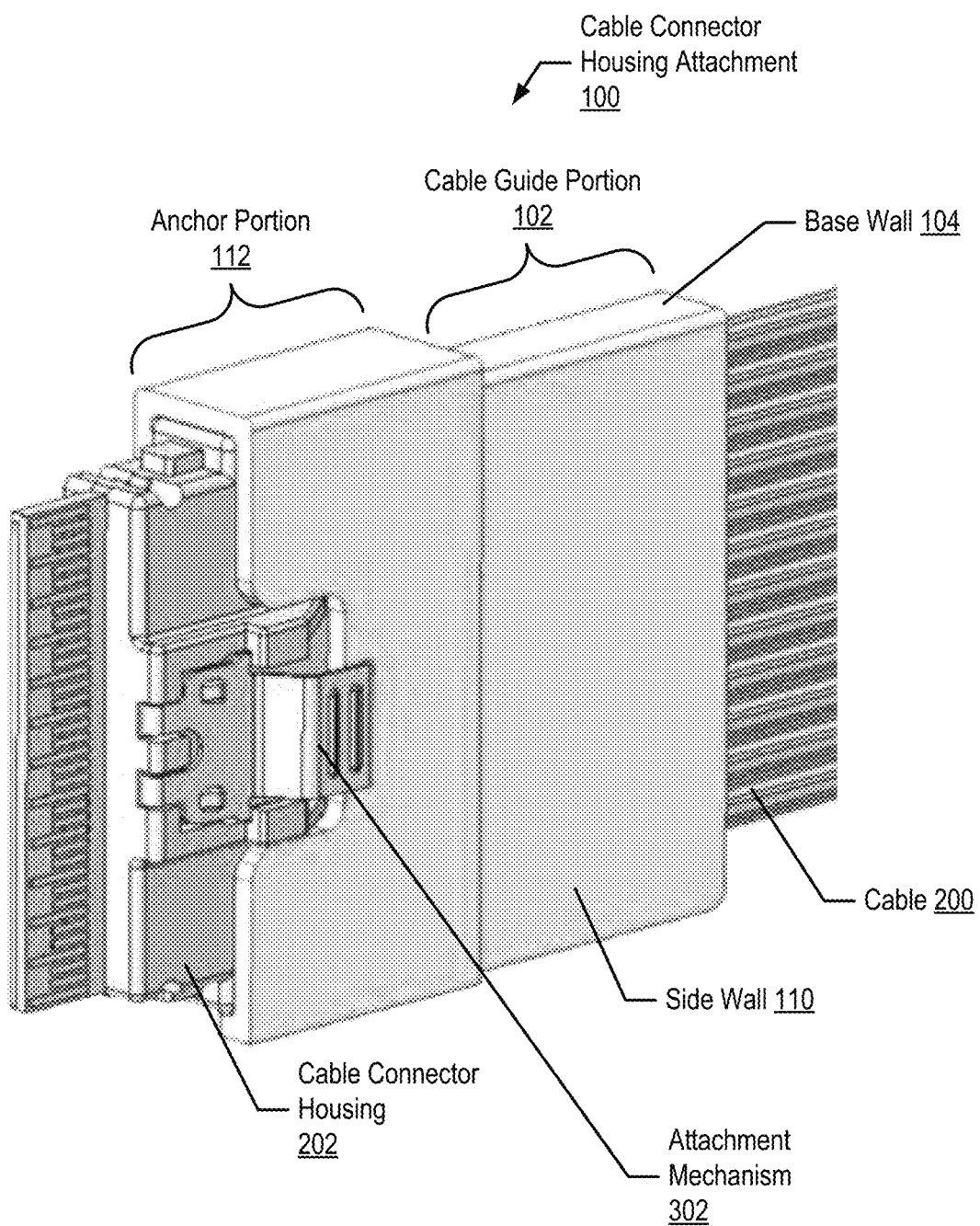
FIG. 3 depicts another perspective view of an example cable connector housing attachment for protecting and directing a cable in accordance with embodiments of the present invention.
Figure 4:
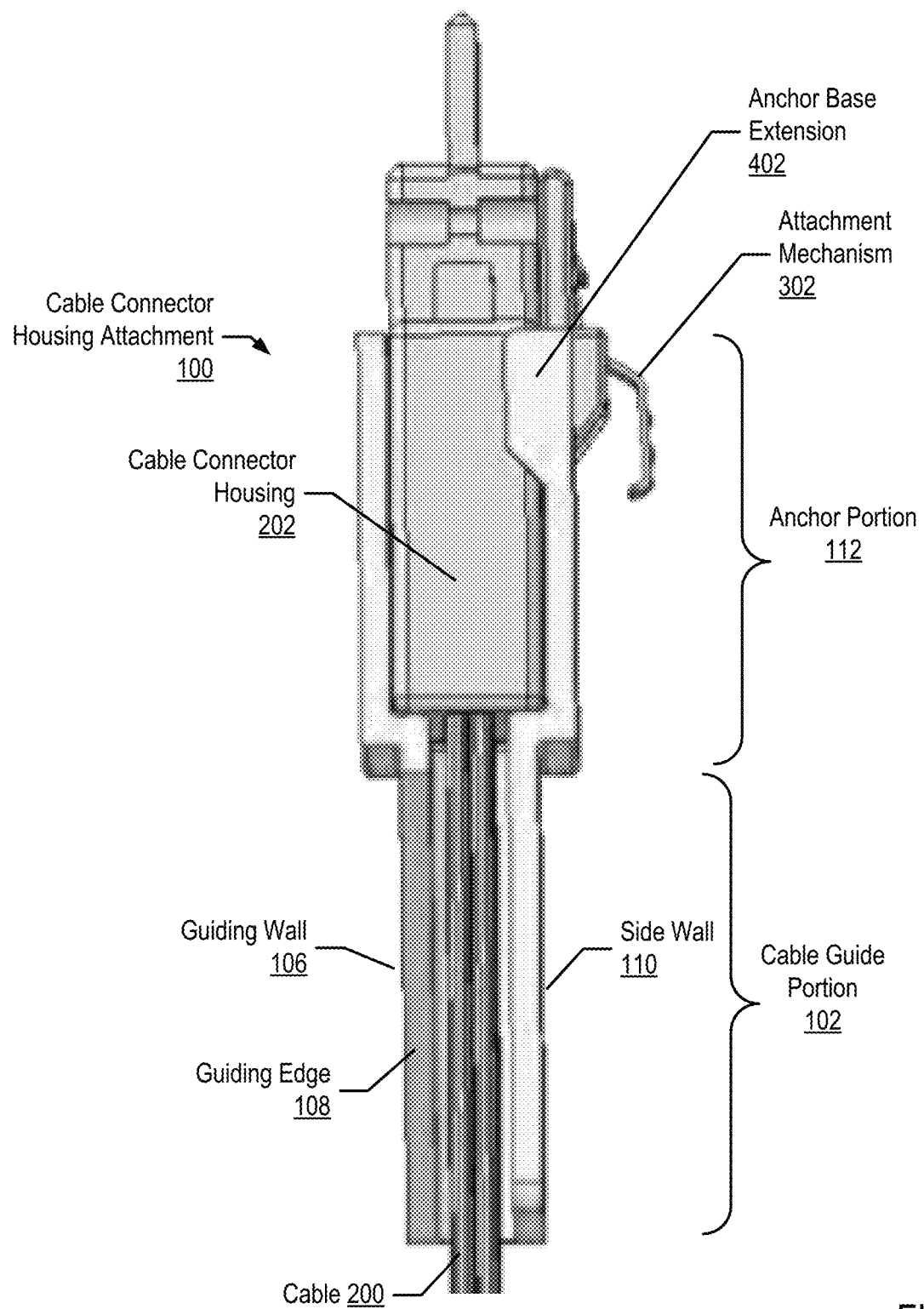
FIG. 4 depicts another perspective view of an example cable connector housing attachment for protecting and directing a cable in accordance with embodiments of the present invention.

FIG. 3 sets forth a perspective view of an example cable connector housing attachment for protecting and directing a cable according to embodiments of the present invention. Specifically, FIG. 3 shows the opposite side of the cable connector housing attachment (100) from that shown in FIG. 2. The example of FIG. 3 includes an anchor portion (112) with a cavity configured to receive an attachment mechanism (302) of the cable connector housing (202). An attachment mechanism (302) may be fixed to either the cable connector housing (202) or the cable connector housing attachment (100). The attachment mechanism (302) may be received by a corresponding part in either the cable connector housing (202) or the cable connector housing attachment (100). The attachment mechanism (302) may be a hook or clip that attaches to a cavity or receiving mechanism on either the cable connector housing (202) or the cable connector housing attachment (100). As shown in the example of FIG. 3, the attachment mechanism (302) is a clip fixed to the cable connector housing (202) that attaches to the cable connector housing attachment (100) at a cavity in the anchor portion (112).

FIG. 4 sets forth a perspective view of an example cable connector housing attachment for protecting and directing a cable according to embodiments of the present invention. Specifically, FIG. 4 shows a bottom view of the cable connector housing attachment (100). The example shown in FIG. 4 includes an anchor portion (112) with an anchor base extension (402) that partially extends over one side of the anchor portion. The cable connector housing attachment (100) may be placed over the cable connector housing (202) using an open side of the anchor portion (112) with an anchor base extension (402). Once the cable connector housing attachment (100) is in place, the anchor base extension (402) may lock the cable connector housing attachment (100) into place over the cable connector housing (202) impeding movement between the connector housing attachment (100) and the cable connector housing (202).

FIG. 5 sets forth a perspective view of an example cable connector housing attachment for protecting and directing a cable according to embodiments of the present invention. Specifically, FIG. 5 shows the cable (200) folded over the guiding edge (108) along an axis dictated by the guiding edge (108) of the guiding wall (106). The guiding edge (108) may direct a bend of the cable (200) in a direction offset from the direction of the cable (200) from the cable connector housing (202). The angle of the guiding edge (108) may depend upon the requirements of the computing system configuration and location of the target component to which the opposite end of the cable terminates.

FIG. 6 sets forth a perspective view of an example cable connector housing attachment for protecting and directing a cable according to embodiments of the present invention. Specifically, FIG. 6 shows the cable connector housing attachment (100) in place inside a computer system.

FIG. 7 sets forth a perspective view of an example cable connector housing attachment for protecting and directing a cable according to embodiments of the present invention. Specifically, FIG. 7 shows an example of the cable connector housing attachment (100) in which there exists no joint or neck between the anchor portion (112) and the cable guide portion (102). In other words, the walls of the anchor portion adjacent to the cable guide portion are continuous with the walls of the cable guide portion adjacent to the anchor portion.

The cable connector housing attachment (100) of FIG. 7 also includes a guiding edge (108) with a curved lip. The curved lip may increase the size of a bend radius for the cable (200) along the guiding edge (108). The curved lip may be of a size that prevents the cable (200) from bending at a radius less than the specification for the cable (200). The thickness of the guiding wall (106) may be used in a similar manner as a curved lip. Specifically, the guiding wall (106) may be of a thickness that prevents the cable (200) from bending at a radius less than the specification for the cable (200).

Figure 8:
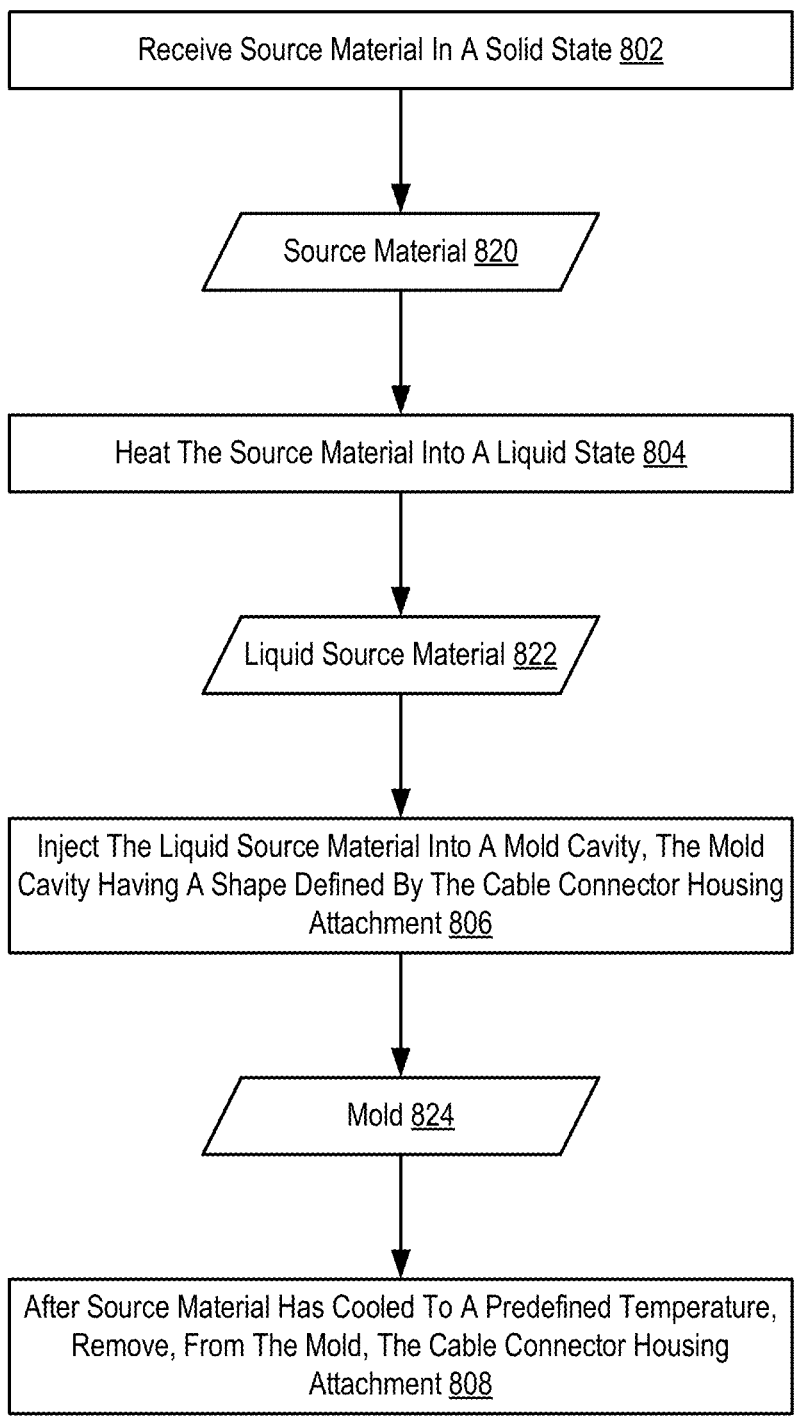
FIG. 8 sets forth a flow chart illustrating an exemplary method for manufacturing a cable connector housing attachment for protecting and directing a cable according to embodiments of the present invention.

For further explanation, FIG. 8 sets forth a flow chart illustrating an exemplary method for manufacturing a cable connector housing attachment for protecting and directing a cable according to embodiments of the present invention. The example method of FIG. 8 includes receiving (802) source material (820) in a solid state. Such source material may include metal, glass, elastomers, thermoplastic and thermosetting polymers, among others. Receiving (802) such source material may be carried out in various ways including, for example, by receiving plastic granules in a hopper.

The method of FIG. 8 also includes heating (804) the source material (820) into a liquid state to obtain liquid source material (822). Heating (804) the source material into a liquid state may be carried out in a variety of ways including, for example, by forcing the granules through a barrel by a reciprocating screw, where a heater increases the temperature of the source material while the source material travels down the barrel.

The method of FIG. 8 also includes injecting (806) the liquid source material (822) into a mold (824) cavity. Injecting (806) the liquid material into a mold cavity may be carried out in various ways including, for example, by forcing the heated, liquid material through a nozzle at the end of the barrel by the reciprocating screw. In the example of FIG. 8, the mold (824) cavity has a shape defined by a cable connector housing attachment for protecting and directing a cable similar to those described above. That is, the mold is configured with a cavity that forms the dimension of a cable connector housing attachment for protecting and directing a cable that includes: an anchor portion configured for attachment to a cable connector housing; and a cable guide portion comprising a base wall, a first side wall, and a second side wall each extending from the anchor portion in the direction of the cable from the cable connector housing, where the first side wall comprises a guiding edge opposite the anchor portion, where the guiding edge creates a non-parallel and non-perpendicular angle relative to the direction of the cable from the cable connector housing, and where the guiding edge directs a bend of the cable in a direction offset from the direction of the cable from the cable connector housing.

The method of FIG. 8 also includes removing (808), from the mold after the liquid source material (822) is cooled to a predefined temperature, the cable connector housing attachment. Removing the cable connector housing attachment from the mold may be carried out by removing a top portion of the mold from a bottom portion. Further, once removed, the cable connector housing attachment may be clamped in a position to ensure that during future cooling to a second predefined temperature (room temperature in some embodiments) the deformation of the cable connector housing attachment is reduced.

In view of the explanations set forth above, readers will recognize that the benefits of a cable connector housing attachment for protecting and directing a cable according to embodiments of the present invention include:
- ensuring the bend radius of a cable is equal to or greater than the minimum specified;
- ensuring the cable path does not have significant bending or torsion near the cable connector housing;
- absorbing forces exerted along the axis of the cable, preventing strain.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An electrical cable connector housing attachment for protecting and directing a cable comprising:
    an anchor portion configured for attachment to a cable connector housing; and
    a cable guide portion comprising a base wall, a first side wall, and a second side wall each extending from the anchor portion in the direction of the cable from the cable connector housing,
    wherein the first side wall comprises an angle guiding edge opposite the anchor portion, wherein the angle guiding edge creates a non-parallel and non-perpendicular angle relative to the direction of the cable from the electrical cable connector housing,
    wherein the angle guiding edge directs a bend of the cable in a direction offset from the direction of the cable from the electrical cable connector housing; and
    wherein the angle guiding edge comprises a curved lip along the angle guiding edge.

2. The cable connector housing attachment of claim 1, wherein the anchor portion comprises a cavity configured to receive an attachment mechanism of the cable connector housing.

3. The cable connector housing attachment of claim 1, wherein the anchor portion comprises an anchor base extension that partially extends over one side of the anchor portion.

4. The cable connector housing attachment of claim 1, wherein the anchor portion comprises a hook that attaches the anchor portion to the cable connector housing.

5. The cable connector housing attachment of claim 1, wherein the anchor portion comprises a clip that attaches the anchor portion to the cable connector housing.

6. The cable connector housing attachment of claim 1, wherein a dimension of a wall of the anchor portion adjacent to the cable guide portion is greater than a dimension of a wall of the cable guide portion adjacent to the anchor portion.

7. An injection mold comprising:
    a cavity configured to receive liquid, injected material, the cavity having a shape defined by an electrical cable connector housing attachment for protecting and directing a cable, the electrical cable connector housing attachment comprising:
    an anchor portion configured for attachment to the electrical cable connector housing; and a cable guide portion comprising a base wall, a first side wall, and a second side wall each extending from the anchor portion in the direction of the cable from the electrical cable connector housing,
    wherein the first side wall comprises an angle guiding edge opposite the anchor portion,
    wherein the angle guiding edge creates a non-parallel and non-perpendicular angle relative to the direction of the cable from the electrical cable connector housing,
    wherein the angle guiding edge directs a bend of the cable in a direction offset from the direction of the cable from the electrical cable connector housing; and
    wherein the angle guiding edge comprises a curved lip along the angle guiding edge.

8. The injection mold of claim 7, wherein the anchor portion comprises a cavity configured to receive an attachment mechanism of the cable connector housing.

9. The injection mold of claim 7, wherein the anchor portion comprises an anchor base extension that partially extends over one side of the anchor portion.

10. The injection mold of claim 7, wherein the anchor portion comprises a hook that attaches the anchor portion to the cable connector housing.

11. The injection mold of claim 7, wherein the anchor portion comprises a clip that attaches the anchor portion to the cable connector housing.

12. The injection mold of claim 7, wherein a dimension of a wall of the anchor portion adjacent to the cable guide portion is greater than a dimension of a wall of the cable guide portion adjacent to the anchor portion.

13. A method of manufacturing an electrical cable connector housing attachment for protecting and directing a cable, the method comprising:
  receiving source material in a solid state;
  heating the source material into a liquid state; and
  injecting the liquid source material into a mold cavity, the mold cavity having a shape defined by the electrical cable connector housing attachment, the electrical cable connector housing attachment comprising:
  an anchor portion configured for attachment to an electrical cable connector housing; and
  a cable guide portion comprising a base wall, a first side wall, and a second side wall each extending from the anchor portion in the direction of the cable from the electrical cable connector housing,
  wherein the first side wall comprises an angle guiding edge opposite the anchor portion, wherein the angle guiding edge creates a non-parallel and non-perpendicular angle relative to the direction of the cable from the electrical cable connector housing, and
  wherein the angle guiding edge directs a bend of the cable in a direction offset from the direction of the cable from the electrical cable connector housing; and
  wherein the angle guiding edge comprises a curved lip along the angle guiding edge.

14. The method of claim 13, wherein the anchor portion comprises a cavity configured to receive an attachment mechanism of the cable connector housing.

15. The method of claim 13, wherein the anchor portion comprises an anchor base extension that partially extends over one side of the anchor portion.

16. The method of claim 13, wherein the anchor portion comprises a hook that attaches the anchor portion to the cable connector housing.

17. The method of claim 13, wherein the anchor portion comprises a clip that attaches the anchor portion to the cable connector housing.

* * * * *